UNITED STATES PATENT OFFICE.

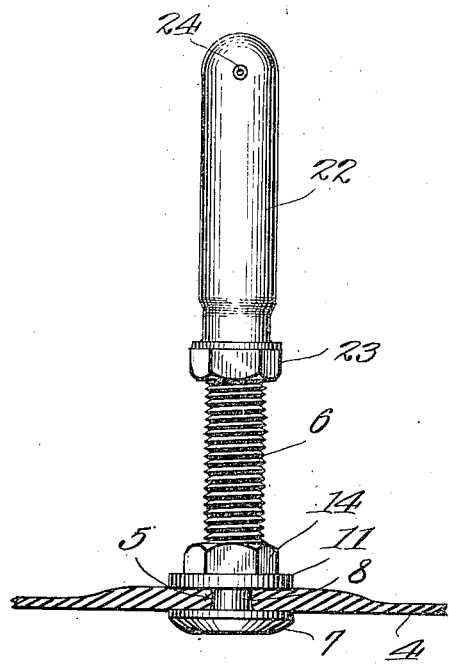

THEODORE BORKGREN, OF GENESEO, ILLINOIS.

TIRE SAFETY-VALVE.

1,125,263.   Specification of Letters Patent.   Patented Jan. 19, 1915.

Application filed March 20, 1914. Serial No. 826,067.

*To all whom it may concern:*

Be it known that I, THEODORE BORKGREN, a citizen of the United States, residing at Geneseo, in the county of Henry and State of Illinois, have invented a new and useful Tire Safety-Valve, of which the following is a specification.

This invention relates to improvements in tire safety valves.

An object of the present invention is to provide a safety valve for tires which will prevent the presence of undue pressure within the tire such as is caused by a heating of the air or through the accidental inflation of the tire to abnormal pressures.

A further object is to provide a safety valve especially adapted to engage the inner tube of a tire and to effect an air-tight juncture therewith, and which safety valve may be easily adjusted by a cap which in addition to providing for the adjustment of the valve, also houses the spring and sliding valve member.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a view in elevation of my improved valve and disclosing the same secured to a tire. Fig. 2 is a longitudinal sectional view of the foregoing. Fig. 3 is a cross sectional view taken on the line 3 3 of Fig. 2.

Referring to the drawings in which similar reference numerals designate corresponding parts throughout the several views, 4 represents a portion of a tire, usually the inner tube, and which is provided with an aperture 5 leading therethrough and through which my improved valve extends so as to communicate with the interior of the tire. A threaded shank 6 is provided at its extreme end with the flange plate 7 by the restricted neck 8. An opening 9 extends through the said shank and terminates at its upper extremity in the enlarged chamber or compartment 10.

In order to rigidly secure the valve to the tire 4 and at the same time to effect an airtight union therewith, the washer 11 is provided, and which as illustrated in Fig. 3, is provided with the inwardly extending shoulders 12 which contact with the mutilated or squared portion 13 of the threaded shank and thus hold the locking washer against rotation. In order to clamp the locking washer rigidly against the outer extremity of the tube or tire 4, the nut 14 is threadedly secured upon the shank and bears downward against the locking washer, thus rigidly clamping the wall of the tube between the flange plate 7 and the said locking washer and forcing the edges of the aperture 5 into rigid contacting with the side walls of the restricted neck 8.

The end wall 15 of the chamber and which is adjacent the extremity of the bore 9 is rounded to form a valve seat for the reception of the valve head 16 of the valve member 17. The valve member includes the rounded head 16, shank 18 and guide portion 19. The guiding portion 19 is made so as to slidably engage the sid walls of the chamber 10 so as to maintain the valve head in proper relation to the valve seat and at the same time allows for the escapement of air through the chamber when the valve head is raised from the seat. The guide member is provided with the outstanding shoulder 20 upon which rests a coiled compression spring 21 which exerts a suitable counter-balancing force upon the valve head, tending to maintain the same in a closed or seated position. A cap 22 threadedly engages the shank 6 and houses the compression spring 21 therein and forces the same down upon the shoulder 20 to thus vary the force exerted upon the valve member, counter-balancing the force due to the pressure upon the head. A nut 23 is positioned upon the shank and acts in the capacity of a locking nut to hold the cap in adjusted positions.

The cap is provided with the aperture 24 extending therethrough and which provides a suitable exit or outlet for the air when the valve head is forced off of the seat due to abnormal internal tire pressures. The guide portion 19 of the valve member insures that the proper seating action will take place between the valve head 16 and the valve seat 15, despite any jars or vibrations incident to the traveling of the wheel at high rates of speed and over uneven ground. The shoulder 20 and guide portion 19 of the valve member also prevent to a large extent the accumulation of any dirt or dust upon the valve seat which would tend to interfere with the proper closing of the valve.

Having thus described my invention, what I claim to be new and original with me is:—

A device of the class described, comprising an externally threaded shank, means for rigidly securing the same to a tire tube, said shank provided with a bore extending therethrough communicating with the interior of the tire and terminating in an upper enlarged chamber, a valve member disposed in said chamber and comprising a head seating upon the bottom of said chamber, a restricted shank, and a guiding portion; the said guiding portion slidably engaging the side walls of the chamber, said guiding portion provided with an outstanding shoulder extending over the upper edge of the said shank, an internally threaded cap engaging said shank and a compression spring housed within said cap, contacting at its upper extremity with said cap and at its lower extremity with the said guiding portion shoulder.

In testimony that I claim the foregoing as my own, I have hereto affixed my signature in the presence of two witnesses.

THEODORE BORKGREN.

Witnesses:
J. A. ANDERSON,
W. R. REHERD.